US009906920B2

(12) United States Patent
Liu et al.

(10) Patent No.: US 9,906,920 B2
(45) Date of Patent: Feb. 27, 2018

(54) BUILDING DESIGN INFORMATION BASED INDOOR POSITIONING SYSTEM

(71) Applicant: Academia Sinica, Taipei (TW)

(72) Inventors: Jane W. S. Liu, Taipei (TW); Jan Su, Nantou County (TW); Cheng-Chieh Li, Miaoli County (TW)

(73) Assignee: ACADEMIA SINICA, Taipei (TW)

( * ) Notice: Subject to any disclaimer, the term of this patent is extended or adjusted under 35 U.S.C. 154(b) by 0 days.

(21) Appl. No.: 15/411,533

(22) Filed: Jan. 20, 2017

(65) Prior Publication Data
US 2017/0215041 A1 Jul. 27, 2017

Related U.S. Application Data

(60) Provisional application No. 62/281,764, filed on Jan. 22, 2016.

(51) Int. Cl.
*H04W 24/00* (2009.01)
*H04W 4/04* (2009.01)
*H04W 40/24* (2009.01)
*H04W 64/00* (2009.01)
*H04L 12/24* (2006.01)
*H04W 84/12* (2009.01)

(52) U.S. Cl.
CPC ............ *H04W 4/04* (2013.01); *H04L 41/145* (2013.01); *H04W 40/244* (2013.01); *H04W 64/00* (2013.01); *H04W 84/12* (2013.01)

(58) Field of Classification Search
CPC ....... H04W 4/04; H04W 64/00; H04W 12/06; H04W 40/244; H04W 88/08; H04W 8/005
See application file for complete search history.

(56) References Cited

U.S. PATENT DOCUMENTS

| 2014/0256346 A1* | 9/2014 | Venkatraman | H04W 4/043 455/456.1 |
| 2015/0341233 A1* | 11/2015 | Marri Sridhar | G01S 5/0252 370/252 |
| 2016/0047890 A1* | 2/2016 | Ryan | G01S 5/16 398/118 |

(Continued)

OTHER PUBLICATIONS

Liu etl al., "BeDIPS A Building/environment Data Based Indoor Positioning Service", Institute of Information Science, Academia Sinica, Technical Report TR-IIS-15-001, Jan. 27 2015, 15 pages.

*Primary Examiner* — Khalid Shaheed
(74) *Attorney, Agent, or Firm* — Muncy, Geissler, Olds & Lowe, P.C.

(57) ABSTRACT

An indoor positioning system based on building design information is disclosed. The system includes a server computer to provide indoor position information relating to a building, a plurality of beacons to be installed in selected locations in the building and to broadcast by each beacon an indoor position message indicating the indoor position of the beacon, and an installer to configure the beacons with their corresponding indoor position information. An indoor positioning system development system is also provided. The development system incorporates building information files and provides a development interface for users to determine respective locations to install the beacons. Once completed, the obtained results are converted into an indoor position message for each beacon and configured in the corresponding beacon.

15 Claims, 4 Drawing Sheets

(56) References Cited

U.S. PATENT DOCUMENTS

| | | | |
|---|---|---|---|
| 2016/0088445 A1* | 3/2016 | Joe ......................... | H04W 4/02 455/456.1 |
| 2016/0127875 A1* | 5/2016 | Zampini, II .......... | H04W 4/043 370/311 |
| 2016/0323753 A1* | 11/2016 | Zhang ................... | G01S 5/0252 |
| 2016/0371394 A1* | 12/2016 | Shahidi ............. | G06F 17/30958 |

* cited by examiner

BUILDING DESIGN INFORMATION BASED INDOOR POSITIONING SYSTEM

CROSS-REFERENCE TO RELATED APPLICATIONS

This application claims the benefit of priority from U.S. Provisional Patent Application Ser. No. 62/281,764, filed on Jan. 22, 2016, the entire disclosures of which are relied upon and incorporated herein by reference.

FIELDS OF APPLICATION

The present invention relates to a building information based indoor positioning system (sometimes referred by the abbreviation IPS), specifically, to an IPS development system and the indoor positioning system produced by the development system.

BACKGROUND OF THE INVENTION

An indoor positioning system (IPS) is a system that generates and provides indoor position information within a building, complex, facility or community to receivers possessed or held by visitors. In large public buildings or facilities such as transport hubs, major hospitals, museums and large department stores, such indoor position information may be provided to mobile receivers, for people who wear them to locate themselves or to receive useful information regarding their location. An indoor positioning system is useful during normal times and is essential during emergencies.

Specifically, an indoor position system serving large public buildings during normal times and emergencies must have the following four attributes: First, the system must be scalable. Orders of magnitude surges in crowd density and location queries may occur daily and during holidays, special occasions and emergencies. Degradation in performance in terms of location accuracy and performance time when surges occur should be small.

Second, the system must be easy to configure, deploy and maintain. Spatial, physical and functional characteristics of large public buildings and building complexes often change due to repairs, renovation and reconfiguration. It is important that updates of the IPS required to take into account the changes can be made systematically and easily. Moreover, the health of the system can be reliably monitored at low cost.

Third, graceful degradation is an essential attribute. The system should be capable of providing location information even when large parts of it are severely damaged. In particular, it should function when Internet and cell phone coverage are disrupted.

Last but not least, the capabilities required of user devices to use the service should be minimal. Ideally, any cell phone usable for originating an indoor emergency call can be used to get the caller's location sufficiently accurately.

Despite years of efforts of research communities on indoor positioning/location technologies and many major players, there is still no clear winner and no common standard today. As an evidence of the dismal state of the art, a goal stated in the road map published by US FCC (Federal Communication Commission) earlier in 2015 is to find, over the next four years, indoor mobile locating methods that can pinpoint a caller's location within about 50 meters if the call is made indoors via a mobile phone. A reason is that existing IPS typically do not work well within complex, large public buildings/facilities, such as transport hubs, major hospitals, and large department stores.

Roughly, location accuracy in the 3 to 10 meter range is achievable by systems using solely received signal strength indicator and triangularization. Such systems require only an application computing, on off-the-shelf smart phones, tablets, or laptops, the location of the device based on power of received WiFi signals from access points at known locations. This type of IPS can be expensive to maintain when the number and locations of WiFi access points change frequently. Moreover, their location accuracy may degrade when large variations in numbers and densities of people and objects they carry and carry them cause significant and unpredictable fluctuations in received signal power.

Systems aiming to provide significantly better accuracy (e.g., down to a fraction of a meter) often use non-standard protocol(s) (e.g., based on low frequency signals, ultrawideband signals, visible light signals, acoustic signals, and magnetic fields) and/or require more sophisticated measurements. A disadvantage of these approaches is that special user devices are required. Systems that use visible light signals clearly do not work during fire emergencies.

Fingerprinting offers another way to improve locating accuracy. The term fingerprint refers to a set of location-specific values of signal power (i.e. a signal pattern). Types of fingerprints used for indoor positioning include patterns of WiFi signals from known access points, FM signals from multiple radio stations, acoustic echo patterns and background spectrum, and magnetic signatures of the building. A fingerprint-based IPS has as a part of its infrastructure a large database of fingerprints captured at different locations in the building during setup and maintenance times and a location/fingerprint server containing mappings of fingerprints to locations. To determine its own location, a mobile device sends the fingerprint captured by it at its location to the server and relies on the server to find the location(s) with matching of fingerprint(s). In addition to requiring user devices with the capability of capturing fingerprints and high cost of maintaining a database of fingerprint-to-location mappings, scalability is a serious shortcoming with all fingerprint-based systems.

OBJECTIVES OF THE INVENTION

The objective of this invention is to provide a novel indoor positioning system that may be easily installed and deliver to users 3D indoor position information with high accuracy. According to certain embodiments of this invention, the IPS delivers 3D indoor location information with no vertical location error and tunable horizontal error in the 3-10 meter range or a room-level accuracy. According to the Indoor Positioning Service Protocol (Adopted Bluetooth Profiles, Protocols, Services and Transports, https://www-.bluetooth.org/en-us/specification/adopted-specifications. Last retrieved Nov. 22, 2015), the precision of horizontal position is moderate (2-5 meters) to fair (5-10 meters).

Another objective of this invention is to provide an indoor positioning system that delivers indoor position information to mobile devices including legacy devices. The indoor positioning system of this invention provides position information to not only modern smart mobile devices such as smart phones, laptops and tablet PCs, but also legacy devices such as feature phones and other classic Bluetooth mobile devices.

Another objective of this invention is to provide a scalable indoor positioning system that delivers indoor position information with an accuracy and response time that do not deteriorate noticeably during orders of magnitude changes in densities and mobility of people and moving objects in its coverage area.

This invention also provides a type of indoor positioning systems/services that can function without Internet and cellular network coverage.

This invention also aims to provide a type of indoor positioning systems that degrade gracefully: When damaged during emergencies, the intact parts of the system continue to function.

This invention aims to provide indoor positioning systems that can be systematically and easily configured, installed and maintained and the health of the system easily and routinely monitored and assessed. An IPS development system for such purposes is also disclosed. The IPS development system provides tools that make use of building information models (BIM) and facility management data of buildings to facilitate the development, configuration, installation and maintenance of indoor positioning systems provided by this invention.

According to the present invention, a novel type of indoor positioning systems is provided: Each system comprises a plurality of beacons installed at selected locations in a building where indoor positioning information is to be provided, a server computer to provide an indoor position information database and at least one IPS installer to provide indoor position information files to corresponding beacons and to assist with installation of the beacons at their selected locations.

Each beacon comprises an indoor position information storage unit to store an indoor position information file containing an indoor position message, a wireless broadcast unit to broadcast the indoor position message and a power supply to supply power to the indoor position information storage unit and the wireless broadcast unit. In some embodiments, the indoor position information storage unit provides a configuration interface to accept configuration instructions from the IPS installer, whereby an indoor position information file may be installed into or modified/replaced in the indoor position information storage unit. In such embodiments, the wireless broadcast unit is provided with wireless or wired communication capabilities, so that the beacon may establish a communication channel and exchange data with the IPS installer and with IPS server computer.

The server computer is provided with an indoor position information database comprising a plurality of indoor position information files, each containing an indoor position message for each beacon in the indoor positioning system. The database also has a file, for each unit (e.g., a room, hall, corridor) in a particular building, containing position information of the unit and relating to the building, information specifying a location in the unit where a corresponding beacon is or will be installed and an identification information of the beacon. In some preferred embodiments of this invention, the location information for each beacon comprises a 3D position information, preferably global position information, of the location where the beacon is or will be installed. In some other preferred embodiments, the position information comprises a relative position information of the unit and its floor identification in the building. In such embodiments, the position information may further comprise at least one selected from the group consisted of a facility description, an advertisement information, a navigation instruction and a safety information.

The IPS installer is in connection with the server computer, either wired or wirelessly, and is configured to obtain an indoor position information file for a designated beacon at a time from the server computer and install the obtained indoor position information file in the designated beacon. The IPS installer may further comprise a reader, to read an installed position information file in a beacon and display at least a portion of the position information.

An IPS (indoor positioning system) development system to be embedded in the server computer is also disclosed. The IPS development system comprises a data converter to extract useful information from a building information file, a graphic display to display unit arrangements of the building, a development tool to display coverage representation of candidate beacons and to accept user's determination in adopting beacons for the unit and the selection of a location in the unit for each adopted beacon, and a position information file generator to generate an indoor position information file for each of the determined/adopted beacons. The indoor position information file for each determined/adopted beacon comprises an indoor position message, including position information relating to a unit of the building in which the beacon is or will be installed. The position information file may further comprise identification information of the adopted beacon and a location information for the location to install the beacon. The IPS development system is configured to receive at least one building information file that comprises representations of 3D arrangements of a plurality of units in a building. The IPS development system is further configured to display a portion of the 3D arrangements and to provide a development tool for user to development or modify indoor position information files. n the preferred embodiments, the the development tool comprises a tool to calculate the coverage of at least one beacon and display a suggestion message, preferably a graphic message, for the user to determine the type and location of each beacon, relatively to one unit of the building, and, upon receipt of a user determination, generate an indoor position information file to include the location information determined by user, an indoor position message relating to the unit and identification of the beacon. In the preferred embodiments, the location information for each beacon comprises a 3D position information, preferably global position information, of the location where the beacon is or will be installed. In some embodiments, the position information comprises a relative position information of the unit and its floor identification in the building. In such embodiments, the position information may further comprise at least one selected from the group consisted of a facility description, an advertisement information, a navigation instruction and a safety information.

A template indoor position message may be provided, such that a combination of the template and an indoor position information forms a complete indoor position message. The IPS development system may further comprise an editor for user to add, delete or change contents of an indoor position message.

These and other objectives and advantages of this invention will be clearly appreciated from the detailed description by referring to the drawings below.

DETAILED DESCRIPTION OF THE INVENTION

Figure 1:
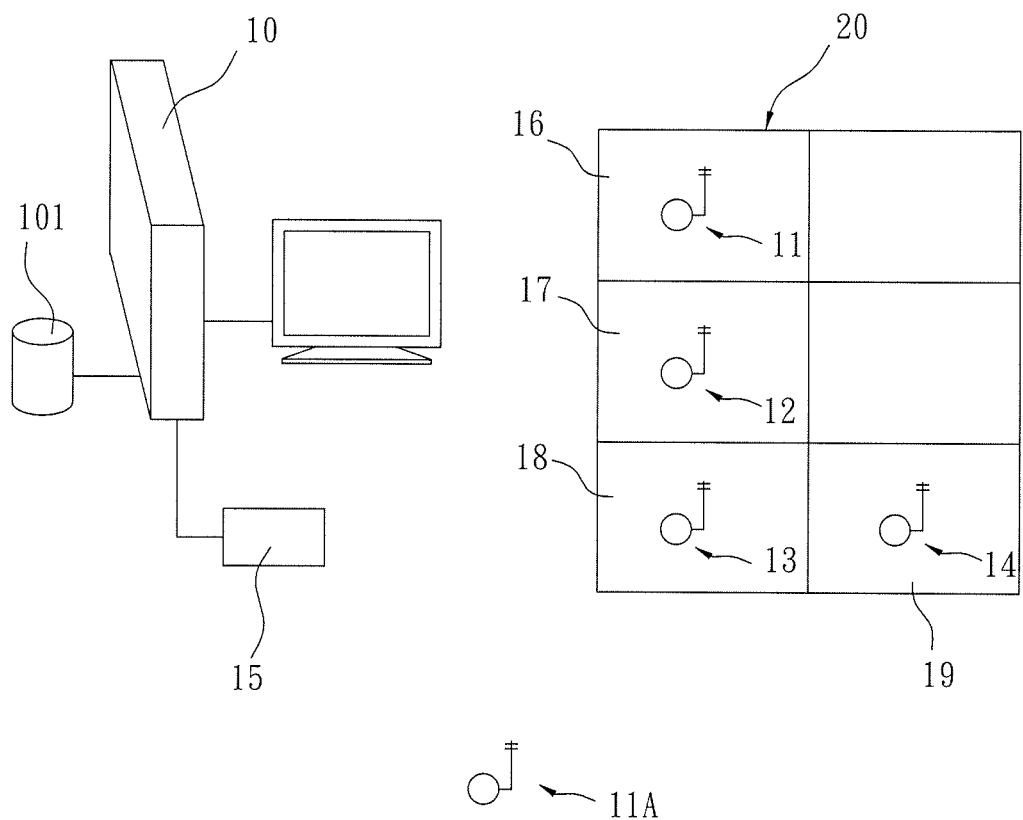
FIG. 1 is systematic diagram of one embodiment of the invented indoor positioning system.

The type of indoor positioning systems provided by this invention is illustrated in FIG. 1, which is the systematic diagram of one embodiment of an indoor positioning system. As shown, the indoor positioning system has three major components: a server computer 10, a plurality of beacons 11, 12, 13, 14, respectively, positioned in one unit 16, 17, 18, 19 of a building 20, and at least one IPS installer 15, connected to the server computer 10 by wire or wirelessly. FIG. 1 also shows a beacon 11A, ready for being configured and installed with an indoor position information file by the IPS installer 15.

The server computer 10 provides an indoor position information database 101 that stores the building information file of the building 20. In the preferred embodiments, the indoor position information database 101 includes building information files of a plurality of buildings. The building information files provides useful information describing 3D arrangement information of most or all units 16, 17, 18, 19 of the building. Generally speaking, a "unit" of a building means a space defined by its partitions, such as a room, a corridor or a large hall. In some embodiments, a unit is defined directly by the coverage space of a beacon or a group of beacons.

A good example of such a building information file is a physical or virtual data repository containing selected datasets from building information models (BIM) and facility management database of a building. The building information file serves to provide useful information for the server computer 10 in the installation, initialization and maintenance of indoor position information files relating to the building. Since the building information files are in most cases standardized, it is possible for those having ordinary skills in the art to develop a tool to retreat useful design data from the files and provide the obtained data for further use. Fox example, a commercially available "Revit®" tool is able to extend a building information file in the BIM format, to plug in location information and identification information of the beacons.

The beacons 11, 12, 13, 14 are designed to deliver location information with 3-5 meter horizontal accuracy and essentially zero vertical errors to common mobile devices without Internet and cell phone coverage. No particular application software is required to receive location data/ descriptions via a broad spectrum of feature phones, and a simple indoor positioning service APP on smart phones can be used for displaying the device location on the indoor map available on the phone.

Figure 2:
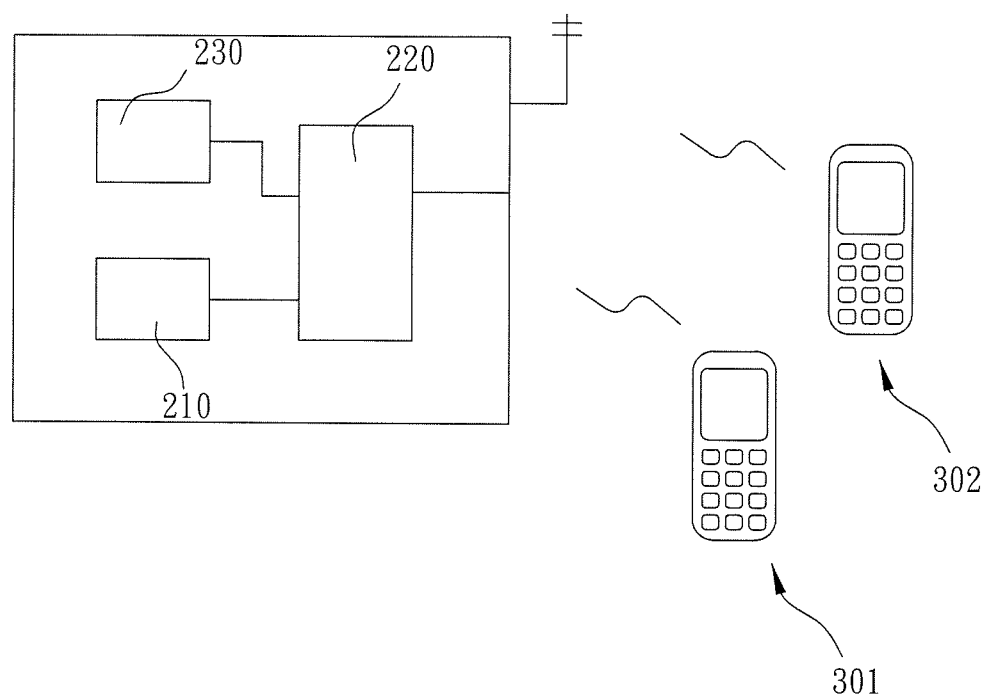
FIG. 2 shows the block diagram of a beacon applicable in the indoor positioning system of this invention.

FIG. 2 shows the block diagram of a beacon 11, 12, 13, 14 applicable in the indoor positioning system of this invention. As shown in this figure, the beacon 11 comprises an indoor position information storage unit 210 to store an indoor position information file containing an indoor position message, a wireless broadcast unit 220 to broadcast the indoor position message and a power supply 230 to supply power to the indoor position information storage unit 210 and the wireless broadcast unit 220. The main task of the beacon 11 is to broadcast the indoor position message stored in its indoor position information storage unit 210 to mobile devices 301, 302. As may be appreciated, the indoor position message is broadcast to all mobile devices within the coverage of the beacon 11 by the wireless broadcast unit 220 through a wireless communication channel. In order to provide the indoor position message and other useful information, the indoor position information storage unit 210 stores at least one indoor position information file. Each indoor position information file includes an indoor position message corresponding to the location where the beacon is or will be installed, to be displayed in the mobile device 301, 302. In FIG. 2, two mobile devices 301, 302 are shown, wherein mobile device 301 is a legacy mobile phone and mobile device 302 is a smart phone. Among the applicable, preferably short-distance, wireless communication protocols, the Bluetooth protocol is widely accepted in the industry and is suited in this invention, due to its reliable and low-cost natures. Other short distance wireless communication channels are also applicable in this invention.

Contents of the indoor position message are not particularly limited to any type but preferably a text message. If the indoor position message is a text message, all mobile devices including the legacy phones, can display the indoor position message. For example, a handset provided with the Object Exchange Protocol or the Object Push Protocol will be able to receive the Bluetooth broadcast messages of the beacons 11, 12, 13, 14 and automatically display the messages: The indoor position message from beacon 11 include information indicating position of beacon 11 relatively to the building 20. In some embodiments, the indoor position message includes the 3D coordinates of the beacon 11 in the building, described in any applicable or understandable form. An APP installed in a smart phone is able to obtain the 3D coordinates and match it to an electronic map or other application software. In most cases the indoor position message comprises an indoor position information of the unit of building in which the beacon 11 is installed. The indoor position information may include a floor identification relating to the building. In the preferred embodiments, the indoor position information includes descriptions of a unit, such as its room number, room name or other description, and the floor on which the unit locates. In such embodiments, the position information may further include a facility description, an advertisement message and/or a safety information, such as indication of evacuation pathways. In practice, the indoor position message may be anyone of the following examples: "You are in front of RM 201 on Level 2. For nearest exit, take escalator down to Level G," "You are in Exhibition Room W2 (Victoria Room) on Level 1. For toilet, use the big green door and turn right," or "You are in a restricted area. Please leave from the door you entered immediately." It is also possible to provide a graphic message but such graphic message can only be displayed in smart phones.

In addition to the indoor position message, an indoor position information file may also include a location information and an identification information of the beacon 11. The location information indicates the location in the building where the beacon 11 is installed or to be installed. This information is useful when the beacons are to be installed and when certain detection results are received from a beacon in any application not described herein. The identification information of a beacon is generally a series number or any information that uniquely describes a particular beacon. This information is the unique representation to a particular beacon 11. The location information and the identification information are generated, when an indoor positioning information system is established and is configured in a beacon by the IPS installer upon installation.

In the examples given above, the "indoor position information" includes descriptions of a unit in the building and its floor, while the indoor position message includes the indoor position information and other information such as facility description, an advertisement message and/or a safety information. The beacon is so designed that the plurality of beacons are installed pervasively throughout the building at locations selected to provide the desired coverage. As the coverage of broadcast of a beacon 11 may be set to around 3-5 meters in diameter, it is possible to achieve the goals of providing 3D indoor location information with essentially no vertical location error and tunable horizontal error in a 3-10 meter range or a room-level accuracy. The coverage of a beacon may be set to a smaller or larger value, as long as number of required beacons does not dramatically increase and overlap of coverage does not impact correctness of the provided messages. Generally speaking, one beacon per unit or room offer suffice to meet the needs of indoor position information. For this purpose, it is possible to provide beacons with different coverages. For example, beacons with the coverage of 3 meter, 5 meter and 10 meter in diameter may be provided to satisfy essentially all possible room/facility conditions. A wireless tag detector responding to wireless tag signals generated within a 3, 5 or 10 meter distance is known in the technical field and may be applicable in this invention after minor modifications.

The wireless broadcast unit 220 may be any commercially available wireless transmitter or wireless transceiver that can broadcast the indoor position message stored in the information storage unit 210 to external. The power supply 230 supplies power to the indoor position information storage unit 210 and the wireless broadcast unit 220. The power supply 230 may generally include a rechargeable battery and a power control unit (both not shown) and supply required power to the other units 210, 220. The power supply 230 may also include a power-saving module, to selectively supply power to the other units 210, 220, in order to save energy. In an alternative embodiment, the beacons are AC powered. The power line supplying power to the beacons may form a communication network, so that all the beacons may be controlled, monitored and maintained centrally from the IPS server (not shown).

A beacon with the structure and functions described above may be realized by those having ordinary skills in the art by using a conventional microprocessor or microcontroller equipped with a memory and a power supply, and a wireless transceiver, as well as necessary circuits and software, after reading this patent specification. Detailed description thereto is thus omitted. A beacon with the structure and functions described above may work independently, even when a part of the building is destructed or when the power system of the building shuts down.

Notably, in some embodiments, the indoor position information storage unit 210 may provide a configuration interface, in order to accept configuration instructions and parameters from the IPS installer 15. As described above, the indoor position information includes descriptions of positions where the beacons 11, 12, 13, 14 are or will be attached. In application, each beacon 11, 12, 13, 14 is configured with its position information, before installed at its working location. After a beacon is installed, the position information stored in its information storage unit 210 may be modified or replaced, to reflect the most updated situation. To provide these and other installation functions, the installation interface of the information storage unit 210 provides a communication protocol accessible from the IPS installer 15 and the IPS installer 15 provides a wireless commutation means to establish a wireless communication channel with the beacon 11, in order to exchange information with the beacon 11. The installation interface of the information storage unit 210 accepts an instruction from the IPS installer 15 to load a new indoor position information file or to modify an existing indoor position information file and, after necessary authentication, the information storage unit 210 saves the received indoor position information file as a replacement of the existing indoor position information file. An IPS installer 15 with such writing or overwriting functions, preferably wirelessly, is known in the technical field. Detailed description thereto is thus omitted.

In some embodiments of this invention, once the system is installed and initialized, each beacon 11, 12, 13, 14 stores locally its own 3D position information in a system-internal format, preferably a standard geo-coordinate format: Its vertical coordinate is in terms of the floor/level of its location (e.g., floors −1, G, 1, 2, . . . 20), and horizontal coordinates are in terms of the latitude and longitude of its location. During runtime, each beacon 11, 12, 13, 14 broadcasts its locally stored coordinates and text message. Intended receivers of such broadcast are Bluetooth enabled devices in its coverage area. A smart device (e.g., a smart phone) may have a HereUAre application software and indoor maps installed. The application software uses the coordinates received from the beacon 11, 12, 13, 14 as input for displaying the location on the indoor map of the building. In such embodiments, however, devices without the said application software or indoor maps simply display the indoor position message from the beacon 11, 12, 13, 14.

The beacons 11, 12, 13, 14 may be installed on the ceiling, floor, partition or any part of the respective unit of the building. Their directional antennas (not shown) point downward or otherwise. In a preferred embodiment, the broadcast range of every beacon 11, 12, 13, 14 is set to less than the ceiling height at its location. Hence, no device below the floor can hear it. This is one way to ensure zero error in the vertical position, while other arrangements and settings are also applicable. The horizontal accuracy/precision of location information delivery by any beacon (or a cluster of adjacent beacons) can be tuned by using a beacon selected for its range and radiation pattern. A complex building such as large shopping malls and transport hubs is likely to require several types of beacons. While beacons with a broadcast coverage ranged around 3 meters or less are suitable for typical rooms, beacons with a broadcast coverage ranged 10 meters or more may be needed for multi-level halls. For 3-meter horizontal accuracy, beacons with 3-meter range and 60-degree coverage suffice, while beacons with larger ranges need to have antennas with narrower radiation patterns.

Figure 3:
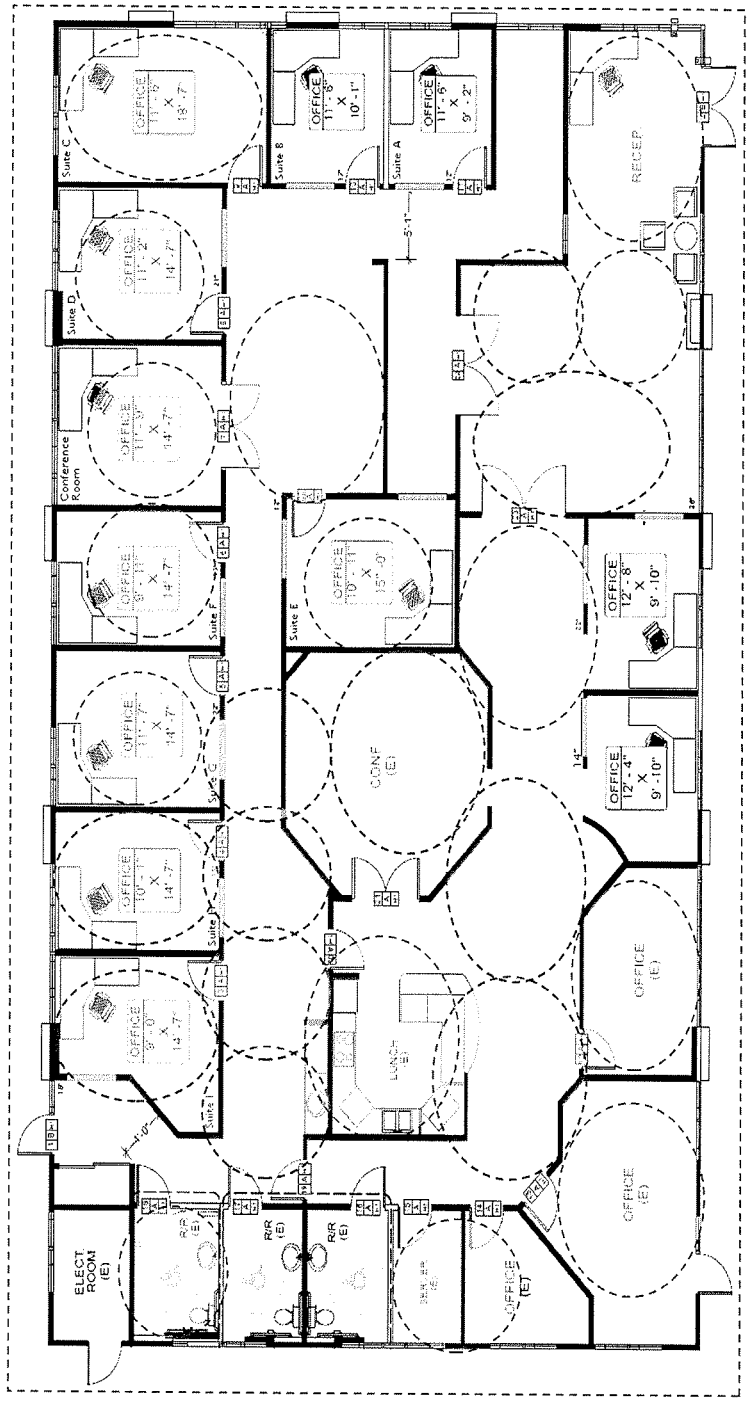
FIG. 3 shows an example of the graphic development interface that may be used in the indoor positioning system development system of this invention.

FIG. 3 shows an example of the graphic development interface of an IPS development tool for the development of an indoor positioning system. It also shows possible configurations and placements of beacons for good coverage and small location errors. At some locations (e.g., in a big exhibition hall), beacons may have overlapping broadcast and/or detection coverage in patterns. In this case, the horizontal location error is bounded from the above by the diameter D of the beacon beam (e.g., 3-5 meters). FIG. 3 also shows incomplete coverage patterns. Such patterns may be acceptable in some some parts of the building. For example, in an office area illustrated by the floor plan in the upper right corner of FIG. 3, a reasonable development goal is to provide room-level accuracy. By accepting small blind spots in coverage, the number of beacons can be reduced.

It is possible to achieve horizontal location accuracy better than the diameter D of beacons coverage if devices in areas covered by multiple beacons can receive the coordinates of the beacons. For example, by having HereUAre application capable of receiving broadcasts from multiple beacons and determining the location of the device based on relative strengths of the received signals, horizontal error can be reduced to a fraction of D. The default development choice is, however, to keep the capabilities required of the user devices at minimal and eliminate the need for HereUAre application. Therefore, in such embodiments the horizontal location accuracy is D.

The scalability attribute of the type of indoor positioning systems of this invention follows from the fact that every beacon delivers location information autonomously during runtime. The accuracy of the location information is independent of the number of devices under its coverage. The load on each beacon is limited by the maximum number of user devices within its coverage area. With the coverage area of each beacon being in order of 10 square meters, the maximum number of people and hence, the number of mobile devices used by them to receive location information, is the range of 10 to 30. Here, the response time of a beacon is measured by the delay from the later of the time instant when the wireless communication function, such as Bluetooth, on the device is turned on and the time instant when the device moves into the coverage area of the beacon to the time instant at which indoor location message from the beacon is received by the mobile device.

Similarly, the fact that the indoor positioning system of this invention degrades gracefully follows from the fact that the beacons operate as standalone devices. As long as a beacon is powered and undamaged, it continues to broadcast its location information, even when most parts of the system are damaged and Internet and phone lines are disrupted.

A development tool that assists a user to development, install and maintain an indoor positioning system is also provided. To illustrate the challenges of developing, installing and maintaining a system of beacons, consider the Frankfurt Airport: The transport hub has approximately 50,000 smoke detectors. It will need two or three times more beacons to achieve 3-5 meter and room-level location accuracy. The tasks of selecting the location of each beacon, determining the coordinates of the location and placing the beacon at the correct coordinates may be realized by the IPS development system and installer of this invention.

Figure 4:
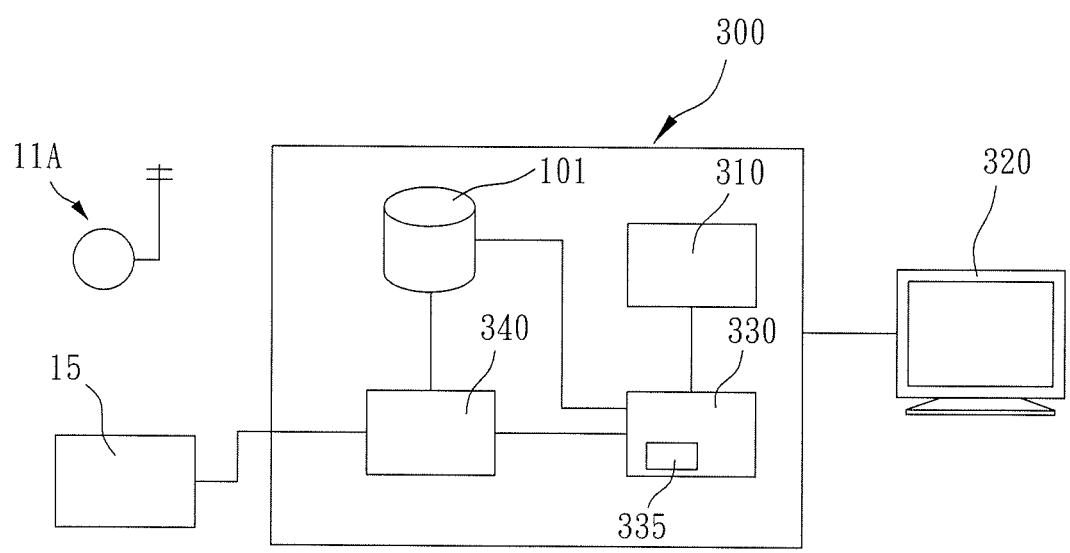
FIG. 4 is block diagram of one embodiment of the IPS development system of this invention.

FIG. 4 is block diagram of one embodiment of the indoor positioning system development system of this invention. As shown in this figure, the indoor positioning system development system 300 includes a data converter 310 to extract useful information from a building data file, a graphic display 320 to display unit arrangements of the building, a development tool 330 to display coverage representation of candidate beacons and to accept user's determination in adopting a beacon and location of the beacon and a position information file generator 340 to generate a position information file for each of the determined beacon. The position information file comprises a position information message, including position information relating to a unit of the building corresponding to the determined beacon. The position information file may further comprise identification information of the adopted beacon. The message may also include at least one selected from the group consisted of a facility description, an advertisement information and a safety information. The development tool 330 may further comprise a calculation tool 335 to calculate a coverage of at least one beacon, to form the coverage representation.

The IPS development system 300 of this embodiment may be embedded in the indoor positioning system, i.e., the server computer 10. The IPS development system 300 is configured to receive at least one building information file that comprises representations of 3D arrangements of a plurality of units in a building. Such building information files are available from existing databases that include design, architect and construction information of large buildings, especially public buildings. Such databases have been created and maintained for purposes of development, architect and construction of the buildings and managing their facilities while the buildings are in use and are made available in most part of the developed world. In addition, mostly these databases are in a standardized format and retrievable by a standardized tool. In general, the repository contains a subset of data in BIM (Building Information Model) of the building, data on its internal facilities and layouts, and data used for facility management and building automation purposes. BIM files of a building give a complete digital representation of physical, functional and spatial characteristics of the building and objects in it. Today, open BIM standards have been developed and adopted by AEC (Architecture, Engineering, and Construction) industries and the use of BIM during the lifecycle of government buildings and construction projects is mandated in an increasingly larger part of the developed world. BIM can also incorporate dynamic information needed to support building operation and maintenance. Furthermore, XML-based data exchange standards enables lightweight deliveries of subsets of BIM. As a result thereof, it is not surprising to see the integration of BIM into facility management systems (FM), the emergence of BIM-based FM Services and building automation systems (BAS). In case where no BIM files of the building is available, it is possible for the user to create a BIM file for the building from blueprints with the help of AutoCAD (http://www.autodesk.com.tw/products/autocad/overview), and blueprints of buildings are typically available even for old buildings constructed before wide adoption of BIM.

This invention takes advantage of these advances to provide an indoor positioning system for each building/facility of some specified size or larger that is to be served by the invented system. The BIM, FM and BAS data of a building in which the indoor positioning system will be installed is first provided to the indoor positioning system development system 300, in the form of for example a computer readable memory medium or an eMail. In addition to providing 2D and 3D geometric models, the server computer 10 supports digital exchange standards for retrieving from it the coordinates of all objects of interest (e.g., electric sockets, light fixtures, and smoke detectors). A data converter 310 is provided to convert contents of the building data file into a unit arrangement description file. In the preferred embodiments, only data relating to locations and arrangements of all units in the building are abstracted from the BIM data and converted. In the embodiments where the beacons broadcast their 3D coordinates in particular, the exact 3D coordinates of every beacon 11, 12, 13, 14 shall be stored and retrievable in the server computer 10.

The IPS development system 300 further comprises a graphic display 320 where a portion of the 3D arrangements of the units in the building is displayed and a development tool 330 to accept user's determination in the locations of the beacons or to change the locations and store the location information, along with a beacon ID, in an indoor position information file corresponding to the respective beacons. In the preferred embodiments, the development tool 330 comprises a calculation tool 335, to calculate a coverage of at least one beacon and to display a coverage representation in the graphic display 320, so to assist a user to determine a location of the beacons. FIG. 3 shows an example of the graphic development interface that may be used in the development tool 330 and displayed in the graphic display 320. As shown in this figure, displayed as background is the layout of one floor of a building, with every unit indicated by its partitions and room numbers/room names. The dotted circles represents the coverage of each candidate beacon. In this figure, two types of beacons, i.e., a 3-meter coverage type and a 5-meter coverage type, are shown. A user is allowed to move a dotted circle or change the coverage of a dotted circle in the graphic display 320 by using a mouse or by pointing in the touch screen. In some applications, the orientation of broadcast of each beacon may also be adjusted and determined. Once a type of beacon is selected and its location is determined, the indoor position information file generator 340 generates an indoor position information file to include at least an indoor position message and an identification information and a location information of the beacon to be installed in the location. The indoor position message relates to the unit in which the selected beacon will be installed. In the preferred embodiments, the location information of the beacons comprises a 3D position information, preferably including a floor identification, of a unit in the building. The identification information will be provided to a beacon and stored therein, to represent the particular beacon after it is installed. The indoor position message includes descriptions of the unit where the particular beacon will be installed, relative to the building and may further comprise at least one selected from the group consisted of a facility description, an advertisement information and a safety information.

A template indoor positioning message may be provided, such that a combination of the template and an indoor positioning information forms a complete indoor positioning message. The indoor positioning system development system may further comprise an editor for user to add, delete or change contents of an indoor positioning message. Information to be added may be descriptions to the facilities provided in the unit, since such information is not included in the BIM data.

As described above, after all the needed beacons and their locations are determined, a plurality of indoor position information files is created by the indoor position information file generator 340. All indoor position information files generated by the indoor position information file generator 340 are stored in the indoor position information database 101 for further use. The files are then written into the respectively corresponding beacons to configure the beacons by using the installer 15, whereby an indoor position message, the location information and the identity of the respective beacons are recorded in the beacons. The beacons are then installed at the location and floor represented by the location information corresponding to their beacon IDs. After actuation, the beacons broadcast corresponding indoor position messages to mobile devices within their respective coverages from time to time or upon the detection of a mobile device.

What are claimed is:

1. An indoor positioning system, comprising a plurality of beacons to be installed at selected locations in a building, a server computer to provide an indoor position information database, and at least one IPS installer to provide particular indoor position information files to corresponding beacons and assists the installations of the beacons at their selected locations;
    wherein the beacon comprises:
        an indoor position information storage unit to store an indoor position information file containing an indoor position message,
        a wireless broadcast unit to broadcast the indoor position message and
        a power supply to supply power to the indoor position information storage unit and the wireless broadcast unit;
    wherein the server computer provides an indoor position information database comprising a plurality of indoor position information files;
    wherein the IPS installer is in connection with the server computer and is configured to obtain an indoor position information file of each beacon from the server computer and install the obtained indoor position information file in a designated beacon; and
    wherein the indoor position information storage unit provides a configuration interface, to accept configuration instructions from the IPS installer, whereby an indoor position information file may be installed into or modified/replaced in the indoor position information storage unit.

2. The indoor positioning system of claim 1, wherein the wireless broadcast unit is provided with wireless communication capabilities, so that the beacon may establish a communication channel and exchange data with the IPS installer.

3. The indoor positioning system of claim 1, wherein IPS installer is in wireless connection with the server computer.

4. The indoor positioning system of claim 1, wherein the indoor position information file comprises a position information of a unit in a particular building and relating to the building, a location information representing a location in the unit where a corresponding beacon will be installed and an identification information of the beacon.

5. The indoor positioning system of claim 4, wherein the location information comprises a 3D position information of the location where the beacon will be installed.

6. The indoor positioning system of claim 4, wherein the position information comprises a relative position information of the unit and its floor identification in the building.

7. The indoor positioning system of claim 6, wherein the position information further comprises at least one selected from the group consisted of a facility description, an advertisement information and a safety information.

8. The indoor positioning system of claim 1, wherein the IPS installer further comprises a reader, to read an installed position information file in a beacon and display at least a portion of the position information.

9. An indoor positioning system development system, comprising:
    a data converter to extract useful information from a building data file relating to a building,
    a graphic display to display unit arrangements of the building,
    a development tool to display coverage representation of candidate beacons and to accept user's determination in adopting a beacon and location of the beacon; and
    an indoor position information file generator to generate an indoor position information file for each of the determined beacon;
    wherein the indoor position information file comprises an indoor position message, including indoor position information relating to a unit of the building corresponding to the determined beacon, wherein the indoor position message further comprises at least one selected from the group consisted of a facility description, an advertisement information and a safety information.

10. The indoor positioning system development system according to claim 9, wherein the indoor position information file further comprises identification information of the adopted beacon and a location information for location to install the beacon.

11. The indoor positioning system development system according to claim 9, wherein the development tool further comprises a calculation means to calculate a coverage of at least one beacon, to form the coverage representation.

12. The indoor positioning system development system according to claim 10, wherein the position location information comprises a 3D position information of a location where the beacon will be installed.

13. The indoor positioning system development system according to claim 9, wherein the indoor position information comprises a relative position information of the unit and its floor identification in the building.

14. The indoor positioning system development system according to claim 9, wherein the indoor position information file generator incorporates a template indoor position message and an indoor position information to form a complete indoor position message.

15. The indoor positioning system development system according to claim 9, further comprises an editor for user to add, delete or change contents to an indoor position message.

* * * * *